US010737575B2

(12) United States Patent
Taskas et al.

(10) Patent No.: US 10,737,575 B2
(45) Date of Patent: Aug. 11, 2020

(54) POWER DEVICE PARAMETER ADJUSTMENT

(71) Applicant: Ford Global Technologies, LLC, Dearborn, MI (US)

(72) Inventors: Petros Taskas, Novi, MI (US); Lihua Chen, Farmington Hills, MI (US); Shuitao Yang, Beaumont, TX (US); Fan Xu, Novi, MI (US); Mohammed Khorshed Alam, Canton, MI (US); Baoming Ge, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 15/820,771

(22) Filed: Nov. 22, 2017

(65) Prior Publication Data

US 2019/0152322 A1    May 23, 2019

(51) Int. Cl.

| B60L 3/00 | (2019.01) |
| H02M 7/537 | (2006.01) |
| B60L 3/12 | (2006.01) |
| B60L 1/00 | (2006.01) |
| H02M 7/5387 | (2007.01) |
| H02M 1/32 | (2007.01) |
| H02M 1/00 | (2006.01) |

(52) U.S. Cl.
CPC ............ B60L 3/003 (2013.01); B60L 1/003 (2013.01); B60L 3/12 (2013.01); H02M 7/537 (2013.01); H02M 7/5387 (2013.01); B60L 2240/525 (2013.01); B60L 2240/526 (2013.01); B60L 2240/527 (2013.01); B60L 2240/80 (2013.01); B60L 2250/16 (2013.01); H02M 2001/0009 (2013.01); H02M 2001/327 (2013.01)

(58) Field of Classification Search
None
See application file for complete search history.

(56) References Cited

U.S. PATENT DOCUMENTS

| 4,992,838 A | 2/1991 | Mori |
| 8,021,987 B2 | 9/2011 | Sugawara et al. |
| 8,686,514 B2 | 4/2014 | Guo et al. |
| 9,199,588 B2 | 12/2015 | Pallares et al. |
| 9,494,657 B2 | 11/2016 | Khan et al. |
| 9,704,959 B2 | 7/2017 | Zhang et al. |
| 2009/0315518 A1 * | 12/2009 | Soma ................ B60K 6/445 320/134 |

(Continued)

FOREIGN PATENT DOCUMENTS

EP        2080659 A1 *  7/2009  ............. B60L 1/003

OTHER PUBLICATIONS

Peter Andrew James, "Health Monitoring of IGBTs in Automotive Power Converter Systems", 2012 Thesis, The University of Manchester, School of Electrical and Electronic Engineering.

*Primary Examiner* — David P. Merlino
(74) *Attorney, Agent, or Firm* — Frank Lollo; Bejin Bieneman

(57) ABSTRACT

A computer includes a processor; and a memory. The memory stores instructions executable by the processor to determine, based on a measurement performed in a vehicle, that a parameter of a power device is outside of a predetermined range; and actuate components in the vehicle to heat the power device.

20 Claims, 8 Drawing Sheets

(56) References Cited

U.S. PATENT DOCUMENTS

| | | | |
|---|---|---|---|
| 2013/0328596 A1* | 12/2013 | Zoels | H03K 17/18 327/109 |
| 2014/0376587 A1* | 12/2014 | Sakashita | B60W 10/08 374/1 |
| 2015/0053173 A1* | 2/2015 | Young | B60W 20/00 123/339.24 |
| 2015/0295490 A1* | 10/2015 | Yamagami | B60L 3/00 363/49 |
| 2015/0340907 A1* | 11/2015 | Lei | H02J 9/061 307/66 |
| 2018/0345793 A1* | 12/2018 | Nishiyama | B60L 3/003 |

* cited by examiner

POWER DEVICE PARAMETER ADJUSTMENT

BACKGROUND

Electric vehicles, hybrid electric vehicles, and plug-in hybrid electric vehicles use power devices such as IGBTs (insulated-gate bipolar transistors) and power MOSFETs (metal-oxide-semiconductor field-effect transistors) to drive a motor in the powertrain and in applications such as charging units and power conversion units. Over time, as power devices age, electrical parameters such as a threshold voltage and on resistance can change. The changes in these electrical parameters may degrade vehicle performance. Further, replacing the power devices is expensive and may require the inconvenience of taking the vehicle to a service station. It is a problem to detect aging power devices and adjust parameters of the power devices.

DETAILED DESCRIPTION

Figure 1:
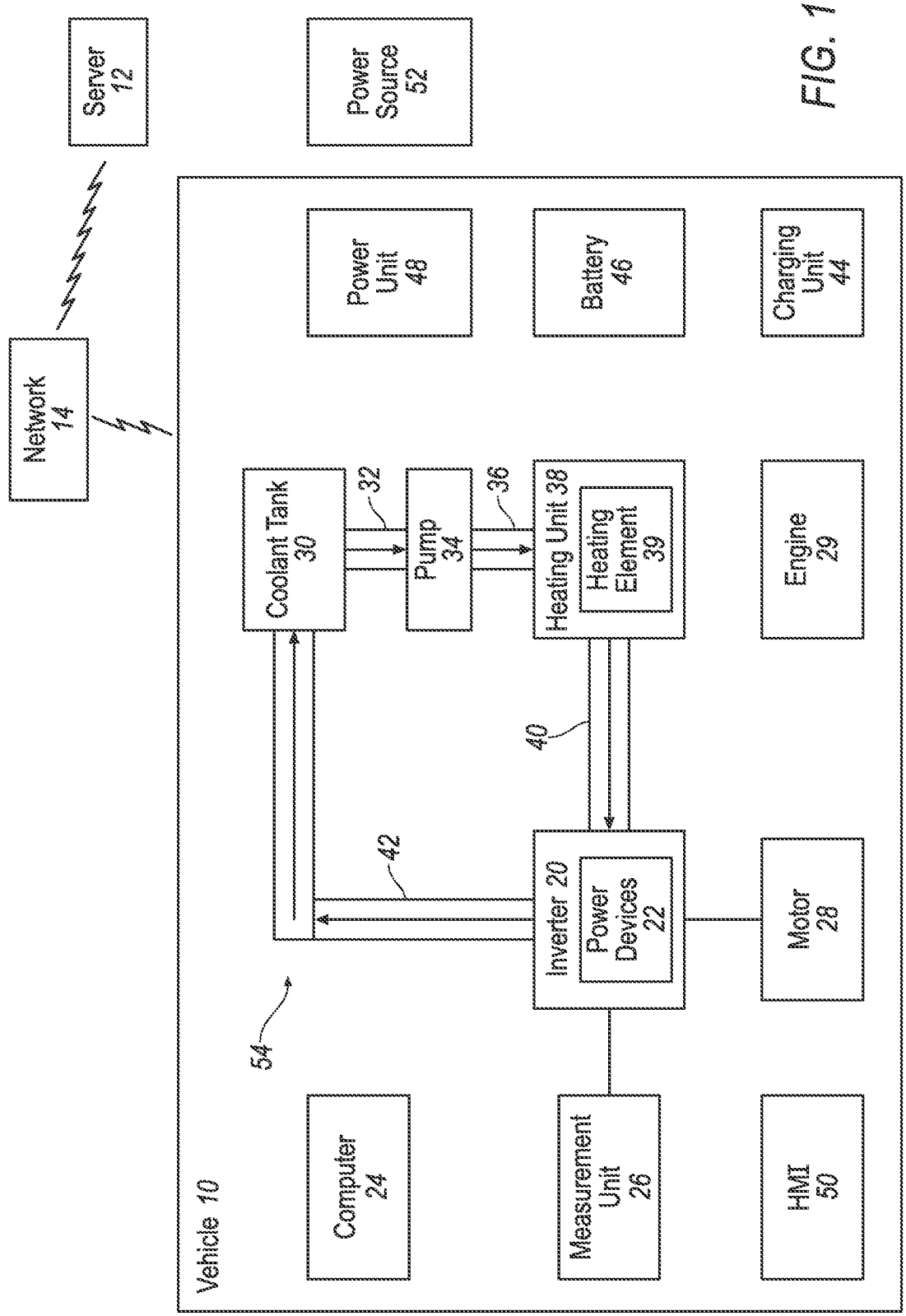
FIG. 1 is a diagram of a system including an exemplary vehicle system for measuring and adjusting electrical parameters of power devices.

A computer includes a processor programmed to determine, based on a measurement performed in a vehicle, that a parameter of a power device is outside of a predetermined range; and actuate components in the vehicle to heat the power device.

The processor can be further programmed to determine that the power device is heated for a predetermined time; perform a second measurement on the power device; determine, based on the second measurement, that the parameter of the power device is in a target range; and store a status of the power device. The parameter of the power device outside of the predetermined range can be one of a threshold voltage and an on-resistance.

The processor can be further programmed to determine, based on the measurement, a target time to heat the power device. The processor can be further programmed to monitor an adjustment time during which the power device is being heated by the vehicle components; and actuate the vehicle components to stop heating the power device when the adjustment time during which the power device is being heated by the components is greater than or equal to the target time.

The instructions to the vehicle components can include instructions executable to activate a heating unit in the vehicle; and pump coolant along a coolant path to transfer heat from the heating unit to the power device.

The processor can be further programmed to actuate the vehicle components to perform the measurement, including: changing a gate-source voltage of the power device as a function of time; monitoring a current through the power device; and measuring the gate-source voltage when the current through the power device reaches a predetermined current.

Determining that the power device is operating outside of the predetermined range can include programming to determine that the gate-source voltage when the current through the power device reaches the predetermined current is outside of the predetermined range.

The processor can be further programmed to actuate the vehicle components to request, via a human-machine interface, authorization to adjust the power device; and transmit the second instructions to the components based in part on receiving authorization to adjust the power device. Requesting the authorization to adjust the power device can include instructions to the human-machine interface to: display, at the human-machine interface, a target time for heating the power device.

A method includes determining, based on a measurement performed in a vehicle, that a parameter of a power device is outside of a predetermined range; and actuating components in the vehicle to heat the power device. The method can further include determining that the power device is heated for a predetermined time; performing a second measurement on the power device; determining, based on the second measurement, that the parameter of the power device is in a target range; and storing a status of the power device.

The method can further include determining, based on the measurement, a target time to heat the power device. The method can further include monitoring an adjustment time during which the power device is being heated by the vehicle components; and actuating the vehicle components to stop heating the power device when the adjustment time during which the power device is being heated by the components is greater than or equal to the target time. The method can further include activating a heating unit in the vehicle; and pumping coolant along a coolant path to transfer heat from the heating unit to the power device.

The method can further include actuating the vehicle components to perform the measurement, including: changing a gate-source voltage of the power device as a function of time; monitoring a current through the power device; and measuring the gate-source voltage when the current through the power device reaches a predetermined current. Determining that the parameter of the power device is outside of the predetermined range can include determining that the gate-source voltage when the current through the power device reaches the predetermined current is outside of the predetermined range. The method can further include requesting, via a human-machine interface, authorization to adjust the power device; and transmitting the second instructions to the components based in part on receiving authorization to adjust the power device.

Further disclosed is a computer including a processor programmed to execute any one of the above method steps. Yet further disclosed is a vehicle including the computer. Yet further disclosed is a computer program product, including a computer readable medium storing instructions executable by a processor, to execute any of the above method steps.

A system includes a vehicle including a power device; measurement means for measuring output of the power device; and a computer. The computer includes a processor programmed to determine, based on a measurement performed in the vehicle by the measurement means, that a parameter of the power device is outside of a predetermined range; and actuate components in the vehicle to heat the power device. The processor can be further programmed to determine that the power device is heated for a predetermined time; perform a second measurement on the power device; determine, based on the second measurement, that the parameter of the power device is in a target range; and store a status of the power device.

FIG. 1 illustrates an example system 5 including a vehicle 10, a server 12 and a network 14. The system 5 may further include a power source 52.

The vehicle 10 includes an inverter 20 including one or more power devices 22. As described herein, the vehicle 10 can measure in a measurement mode, and adjust, in an adjustment mode, parameters of the power devices 22. The system 5 may further include a power source 52, which may be an electrical outlet.

The vehicle 10 includes a computer 24. The vehicle 10 may further include the inverter 20, a measurement unit 26, a motor 28, an engine 29, a coolant tank 30, a pump 34, a heating unit 38, a charging unit 44, a battery 46, a power unit 48 and a human-machine interface (HMI) 50 (collectively components), each of which may be communicatively coupled, e.g., in a manner further described below, with the computer 24. In some cases, the vehicle 10 may not include one or more of these components. For example, as described below, in some cases, the vehicle 10 may not include the coolant tank 30.

To cool the power devices 22 during normal mode, and to heat the power devices 22 in the inverter 20 during the adjustment mode, the vehicle 10 circulates coolant through a coolant path 54. Normal mode may also be referred to herein as normal operation. The coolant path 54 includes the coolant tank 30, a first pipe 32, the pump 34, a second pipe 36, the heating unit 38, a third pipe 40, the inverter 20, and a fourth pipe 42.

The coolant path 54 is only an example. Elements such as the pump 34, heating unit 38, inverter 20, etc. may be arranged in a different order than as in the present example. Further, in some cases, the coolant path 54 may not include all of the elements. For example, the coolant path 54 may not require a coolant tank 30.

The coolant path 54 is conventionally provided to remove heat from the power devices 22 in the normal mode. Moreover, as described further below, the coolant path 54 is arranged in a manner to transfer heat from the heating unit 38 to the power devices 22 in the inverter 22 during adjustment mode. In the case that the coolant path 54 does not include the coolant tank 30, the coolant contained in the remainder of the coolant path 54 transfers heat for cooling the power devices 22 in normal mode, and heating the power devices 22 in adjustment mode.

The inverter 20 includes one or power devices 22 and is drivingly coupled to (i.e., can drive), in normal mode, the motor 28. The inverter 20 includes a computer, and is communicatively coupled to the computer 24. As described in additional detail below, the inverter 20 can, in the measurement mode, provide access to the measurement unit 26 to electrical nodes and signals within the inverter 20. In some cases, the inverter 20 may be operating normally, i.e., as in the normal mode, during the measurement mode. In these cases, the measurement mode indicates that electrical nodes and other signals within the inverter 20 are made available to the measurement unit 26 and the measurement unit 26 performs measurements, while the inverter 20 operates normally. The measurement unit 26 can perform measurement of electrical parameters of the power devices 22. The power devices 22 may be devices such as power metal-oxide-semiconductor field-effect transistors (MOSFETs) or insulated-gate bipolar transistors (IGBTs). The power devices 22 have electrical parameters, i.e., including a threshold voltage. Electrical parameters are numerical or other measurable factors forming a set that describes conditions of operation of the respective power device 22. The threshold voltage is a voltage between a control input and a first conducting terminal of the power device 22 at which the power device 22 conducts current at or above a predetermined current. In the case of a power MOSFET, the control input is referred to as the gate terminal and the first conducting terminal to which the threshold voltage is referenced is referred to as the source terminal. In the case of the IGBT, the control input is referred to as the gate terminal and the first conducting terminal to which the threshold voltage is referenced is referred to as the emitter terminal. The power MOSFET has a second conducting terminal referred to as the drain terminal. The IGBT has a second conducting terminal referred to as the collector terminal.

The processes for measuring and adjusting power devices 22 below refer to measuring and adjusting electrical parameters of power MOSFETs. The processes can also be applied for measuring and adjusting the electrical parameters of IGBTs.

The computer 24 includes a processor and a memory. The memory includes one or more types of computer-readable media, and storing instructions executable by the processor for performing various operations, including as disclosed herein. Further, the computer 24 may include and/or be communicatively coupled to one or more other computers, including vehicle components such as the inverter 20, measurement unit 26, motor 28, engine 29, coolant tank 30, pump 34, heating unit 38, charging unit 44, battery 46, power unit 48 and HMI 50, which likewise may include respective processors and memories. Communications, i.e., communicative coupling, may be achieved via a controller area network (CAN) bus or local interconnect network (LIN) bus, a wired and/or wireless in-vehicle local area network (LAN), e.g., using wired or wireless technologies such as Wi-Fi®, Bluetooth®, etc.

The measurement unit 26 is electrically coupled to the inverter 20, and includes one or more sensors for detecting electrical parameters of the power devices 22 in the inverter 20. The measurement unit 26 may additionally include one or excitation units such as a power supply or current source that may be used to apply steady state or time varying voltages or currents to nodes on of the power devices 22 or other electrical nodes within the inverter 20. The measurement unit 26 includes a computer, and is communicatively coupled to the computer 24. As described in additional detail below, the measurement unit 26 may be programmed in the measurement mode to sense electrical parameters of one or more of the power device 22, and provide the data specifying the electrical parameters of the one or more power devices to the computer 24 In some cases, the measurement unit 26 may additionally or alternatively be programmed to apply a voltage or current to one or more nodes on the power devices 22 within the inverter 20.

The motor 28 is an electric motor as is known for use in drive train applications in the vehicle 10. The motor 28 is electrically coupled to, and driven by, the inverter 20.

The vehicle 10 may further include an engine 29. The engine 29 may be a diesel or gasoline combustion engine. The computer 24 may be programmed to activate the engine 29 during the adjustment mode to charge the battery 46. In this case, the engine 29 may drive the charging unit 44, which converts mechanical energy from the engine 29 to electrical energy.

The coolant tank 30 is a tank for containing coolant. When the coolant is circulating, the coolant enters the coolant tank 30 through the fourth pipe 42 connected between the inverter 20 and the coolant tank 30. The coolant exits the coolant tank 30 through the first pipe 32 connected between the coolant tank 30 and the pump 34. As noted above, in some cases, the vehicle 10 does not include a coolant tank 30.

The pump 34 can pump coolant around the coolant path 54. The pump 34 includes a computer communicatively coupled to the computer 24 and an actuator to pump the coolant. The computer in the pump 34 is programmed to control the actuator based on instructions from the computer 24.

The heating unit 38 includes a computer and a heating element 39 such as an electrical resistance heating element and may further include one or more switches to turn on the heating element 39. The computer in the heating unit 38 is communicatively coupled to the computer 24. The computer in the heating unit 38 is programmed to receive instructions from the computer 24, and, based on the instructions, turn the heating element 39 on and off. In normal mode, the heating element 39 will be turned off, as the coolant is used to cool the power devices 22 in this mode. As described in additional detail below, during the adjustment mode, the heating element 39 in the heating unit 38 may be turned on to heat the power devices 22, and thereby adjusting electrical parameters of the power devices 22.

The charging unit 44 generates electrical energy from mechanical energy from the engine 29. During the adjustment mode, the engine 29 may be activated from time-to-time to maintain a charge in the battery 46.

The battery 46 may be, for example, a lithium-ion or nickel-metal hydride battery, an ultracapacitor, or a fuel cell. This list is not intended to be limiting. The battery 46 may be any type of charge storage device. The battery 46 may be connected to the charging unit 44 so that it can be charged thereby. Additionally or alternatively, the battery 46 may further be charged by plugging the vehicle 10 into an external power source, such as the power source 52.

The vehicle 10 may include a power unit 48. The power unit 48 may receive power from the battery 46. The power unit 48 may further convert the voltage level of the power from the battery 46 to one or more voltage levels compatible with power consumers in the vehicle 10 such as the pump 34, the heating unit 38, etc.

The vehicle 10 further includes a human-machine interface (HMI) 50. The HMI 50 may allow an occupant of the first vehicle 10 to interface with the computer 24 and components of the vehicle such as the measurement unit 26, the inverter 20, the pump 34, the heating unit 38, etc. The HMI 50 may include any one of a variety of computing devices including a processor and a memory, as well as communications capabilities. The HMI 50 may be a portable computer, tablet computer, mobile phone, e.g., a smart phone, et., that includes capabilities for wireless communications using IEEE 802.11, Bluetooth, and/or cellular communications protocols, etc. The HMI 50 may further include interactive voice response (IVR) and/or a graphical user interface (GUI), including a touchscreen or the like, etc. The HMI 50 may communicate with a network that extends outside of the vehicle 10 and may communicate directly with an external server, e.g., using Bluetooth, etc.

The HMI 50 may communicate requests to the user, such as a request to the user to authorize the adjustment mode to adjust parameters of a power device 22. The HMI 50 may receive instructions from the user, such as instructions to authorize the adjustment mode, interrupt the adjustment mode, delay executing the adjustment mode, etc., and transmit the instructions to the computer 24.

The system 5 may include the power source 52. The power source 52 may be an electrical outlet, configured to provide power to the vehicle 10 to charge the battery 46. In the case of operating the vehicle 10 in the adjustment mode, the power source 52 may additionally be used to provide power to the heating unit 38.

The server 12 includes a processor and a memory, the memory storing instructions which may be executed by the processor. The server 12 is communicatively connected with the vehicle 10 via the network 12.

The server 12 is programmed to receive and store data related to the electrical parameters of the power devices 22 and the adjustments made to the power devices 22. For example, the server 12 may store and maintain historical threshold voltage and/or on resistance data for each power device 22. The server 12 may further store and maintain data representing details of adjustment modes, such as how long, and at what temperature, an adjustment was made to a power device 22, and the resulting changing in the threshold voltage and/or on-resistance. The server 12 may be programmed to correlate data from the vehicle 10 with other vehicles, to develop, for example, statistical data indicating how long it takes to adjust a threshold or on-resistance a fixed amount (e.g., 1 volt) for power devices 22 when heated to a specified temperature.

The network 14 is one or more mechanisms by which the vehicle 10 and the server 12 communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth®, IEEE 802.11, etc.), local area networks (LAN) and/or wide area networks (WAN), including the Internet, providing data communication services.

The types of wireless communications may include one or more of cellular, Bluetooth®, IEEE 802.11 (typically, Wi-Fi®), dedicated short range communications (DSRC), two-way satellite (e.g., emergency services), one-way satellite (e.g., receiving digital audio radio broadcasts), AM/FM radio, etc.

Figure 2:
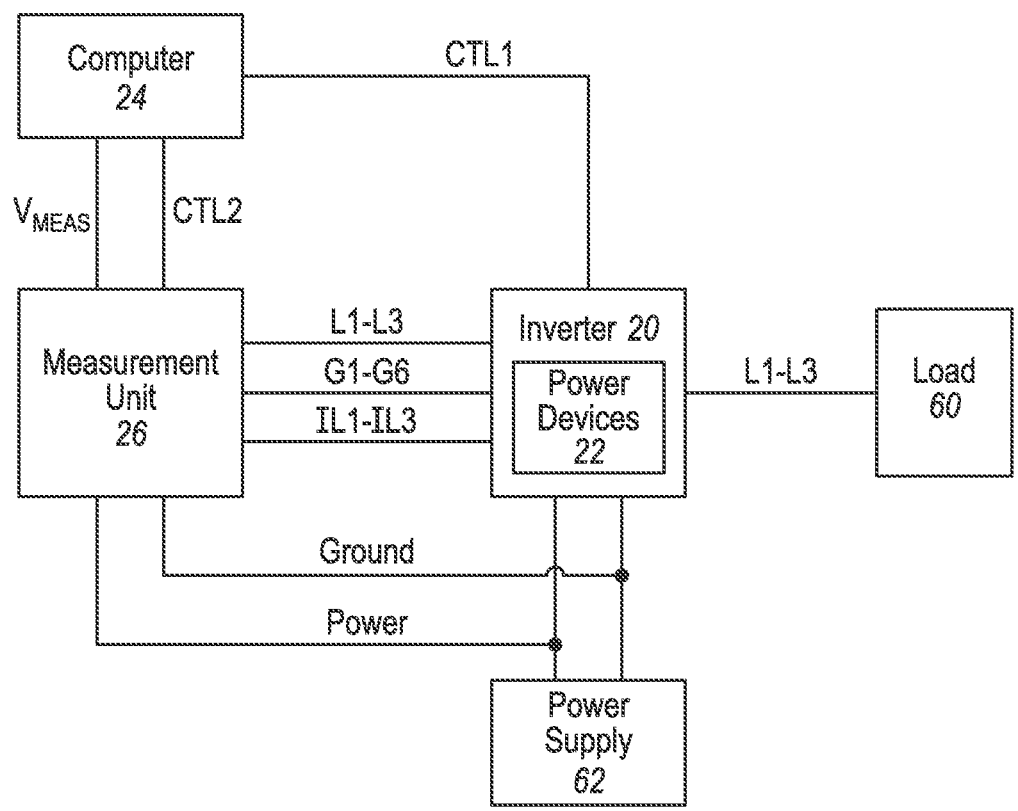
FIG. 2 is a diagram of a portion of an exemplary vehicle system to measure the electrical parameters of power devices included in an exemplary inverter.

FIG. 2 illustrates a system or subsystem of the exemplary vehicle 10 configured to measure parameters of the power devices 22 included in the inverter 20. The computer 24 is programmed to execute the measurement mode. The measurement mode is a mode of operation wherein the computer 24 is programmed, and the measurement unit 26 is coupled to nodes and signals, to measure one or more electrical parameters of the power devices 22. The computer 24 is communicatively coupled with the inverter 20 via a communications channel CTL1. In the measurement mode, the computer 24 may send one or more instructions to the inverter 20 to set up to measure one of the power devices 22. As described in additional detail below, setting up to measure the power device 22 may include providing access to the measurement unit 26 of one or more electrical nodes in the inverter 20.

The computer 24 is further communicatively coupled with the measurement unit 26 via a communications channel CTL2 and the node $V_{MEAS}$.

The inverter 20 includes one or more power devices 22 as described above. The inverter 20 receives as an input, instructions from the computer 24, via the communications channel CTL1. Additionally, the inverter 20 is coupled to a power output and a ground connection of a power supply 62. The inverter 20 may output one or more currents I1-I3 respectively on nodes L1-L3 to a load 60.

The inverter 20 may be switched to a state to provide access to the measurement unit 26 to one or more nodes of the inverter 20. The inverter 20 may include electrical switches that switch nodes such as a gate node or a source node of a power device 22 to a node that is coupled to the measurement unit 26. The computer 24 may actuate the switches to provide access to selected electrical nodes to the measurement unit 26. The one or more nodes may include one or more of the gate nodes G1-G6 of the power devices 22, and may further include the nodes L1-L3. Additionally, the inverter 20 may provide one or more signals IL1-IL3 from the respective current sensors CS1-CS3. The signals IL1-IL3 are signals indicating respectively the currents I1-I3.

The measurement unit 26 is communicatively coupled with the computer 24 via the communications channel CTL2 such that the measurement unit 26 can receive one or more instructions from the computer 24. The measurement unit 26 may further receive as inputs the signals IL1-IL3 from the respective current sensors CS1-CS3. The measurement unit 26 may further receive as inputs the gate nodes G1-G6 of the power devices 22. Still further the measurement unit 26 may receive as inputs the power output and ground connection from the power supply 62.

Based on the inputs received from the inverter 20 and the power supply 62, the measurement unit 26 is programmed to determine a threshold voltage for one or more of the power devices 22. Additionally or alternatively, the measurement unit 26 may be programmed to determine an on-resistance for one or more of the power devices 22. The measurement unit 26 is further programmed to output a signal $V_{MEAS}$ representing respectively the threshold voltage for the one or more power devices 22. Alternatively, in the case of measuring the on-resistance of a power device 22, $V_{MEAS}$ may represent the on-resistance of the respective power device 22.

The power supply 62 is coupled to supply the power output and the ground connection to the inverter 20 and the measurement unit 26. In some configurations, the power supply 62 may be a battery such as the battery 46. In other configurations, the power supply 62 may be a power unit such as the power unit 48.

The load 60 typically includes a motor such as the motor 28. Additionally or alternatively, an electrical circuit including resistors, capacitors, inductors and switching devices such as transistors may be included in the load 60.

Figure 3:
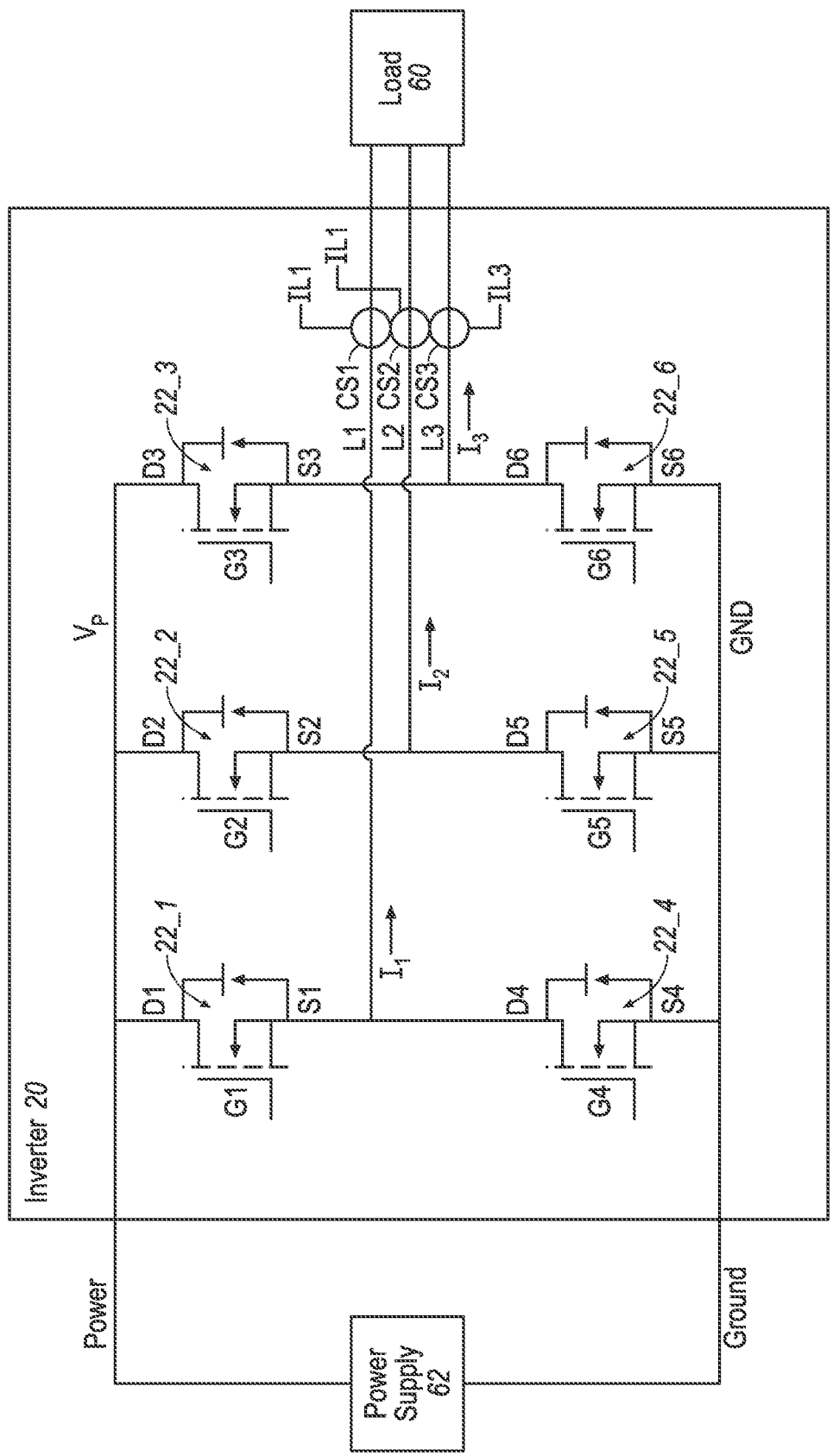
FIG. 3 is a diagram of an exemplary inverter including six power devices.

FIG. 3 illustrates an exemplary inverter 20 coupled to the load 60 and the power supply 62. The inverter 20 includes six power devices 22-1, 22-2, 22-3, 22-4, 22-5 and 22-6 (collectively power devices 22). The six power devices 22-1, 22-2, 22-3, 22-4, 22-5 and 22-6 include respectively gate terminals G1, G2, G3, G4, G5 and G6, drain terminals D1, D2, D3, D4, D5 and D6 and source terminals S1, S2, S3, S4, S5 and S6.

Power devices 22-1 and 22-4 are arranged in series between a power node VP and a ground node GND. The source terminal S1 of power device 22-1 is coupled via the node L1 to the drain terminal D4 of power device 22-4. Power devices 22-2 and 22-5 are similarly arranged in series between the power node VP and the ground node GND with the source terminal S2 of power device 22-2 coupled via the node L2 to the drain terminal D5 of power device 22-5. Power devices 22-3 and 22-6 are also arranged in series between a power node VP and a ground node GND with source terminal S3 of power device 22-3 coupled via the node L3 to the drain terminal D6 of power device 22-6.

The inverter 20 includes three current sensors CS1, CS2 and CS3. The current sensors CS1, CS2 and CS3 measure respectively the current through nodes L1, L2 and L3 and output respectively signals IL1, IL2 and IL3.

During the measurement mode, the measurement unit 26 may measure a voltage between the gate terminal and the source terminal of one of the power devices 22 while monitoring a current through the power device 22 to determine the gate-source voltage at which the current reaches a predetermined current. This measurement may be performed while the power device 22 is being turned on. That is, the measurement may be performed during a time period that the gate-source voltage is ramping from a voltage below the threshold voltage toward the threshold voltage.

For example, to measure the power device 22-4, the measurement unit 26 may measure the voltage between the gate terminal G4 and the source terminal S1 (coupled to GND) while monitoring the current I1 on node L1. The computer 24 is programmed to turn the power device 22-1 off during this measurement, or conduct the measurement at a time when the it is known that the power device 22-1 is turned off. The current I1 is monitored by the current sensor CS1 which provides the signal IL1 to the measurement unit 26.

During turning on of the power device 22-4, the gate-source voltage between the gate terminal G4 and the source terminal S1 increases starting at a voltage below the threshold voltage. As the gate source voltage approaches threshold voltage, the current I1 starts to increase. The gate-source voltage between the gate terminal G4 and the source terminal S1 when the current I1 reaches the predetermined limit is identified as the threshold voltage for the power device 22-4.

In a comparable manner, the threshold voltage of each of the other power devices 22-1, 22-2, 22-3, 22-5 and 22-6 can be measured. The voltages and currents to be measured identified in table 1 below.

TABLE 1

| Device | Gate Terminal | Source Terminal | Current | Current Sensor Output | Conditions |
|---|---|---|---|---|---|
| 22-1 | G1 | L1 | I1 | IL1 | G4 off |
| 22-2 | G2 | L2 | I2 | IL2 | G5 off |
| 22-3 | G3 | L3 | I3 | IL3 | G6 off |
| 22-4 | G4 | GND | I1 | IL1 | G1 off |
| 22-5 | G5 | GND | I2 | IL2 | G2 off |
| 22-6 | G6 | GND | I3 | IL3 | G3 off |

Additionally or alternatively to measuring the threshold voltage for the respective power devices 22, the measurement unit 26 may measure an on-resistance for the respective power devices 22. In this case, the measurement unit 26 may, for example, apply a voltage from the gate to the source of a power device 22, measure a voltage from the drain to the source of the power device 22, and further measure a current from drain to source through the power device 22.

For example, to measure the on-resistance of the power device 22-4, the measurement unit 26 may apply (or measure) a voltage from G4 to GND. The measurement unit 26 may further measure a voltage from L1 to GND. The measurement unit 26 may further receive the signal IL1 that represents the current I1. The on-resistance can be calculated to be on-resistance=(voltage from L1 to GND)/I1.

Figure 4:
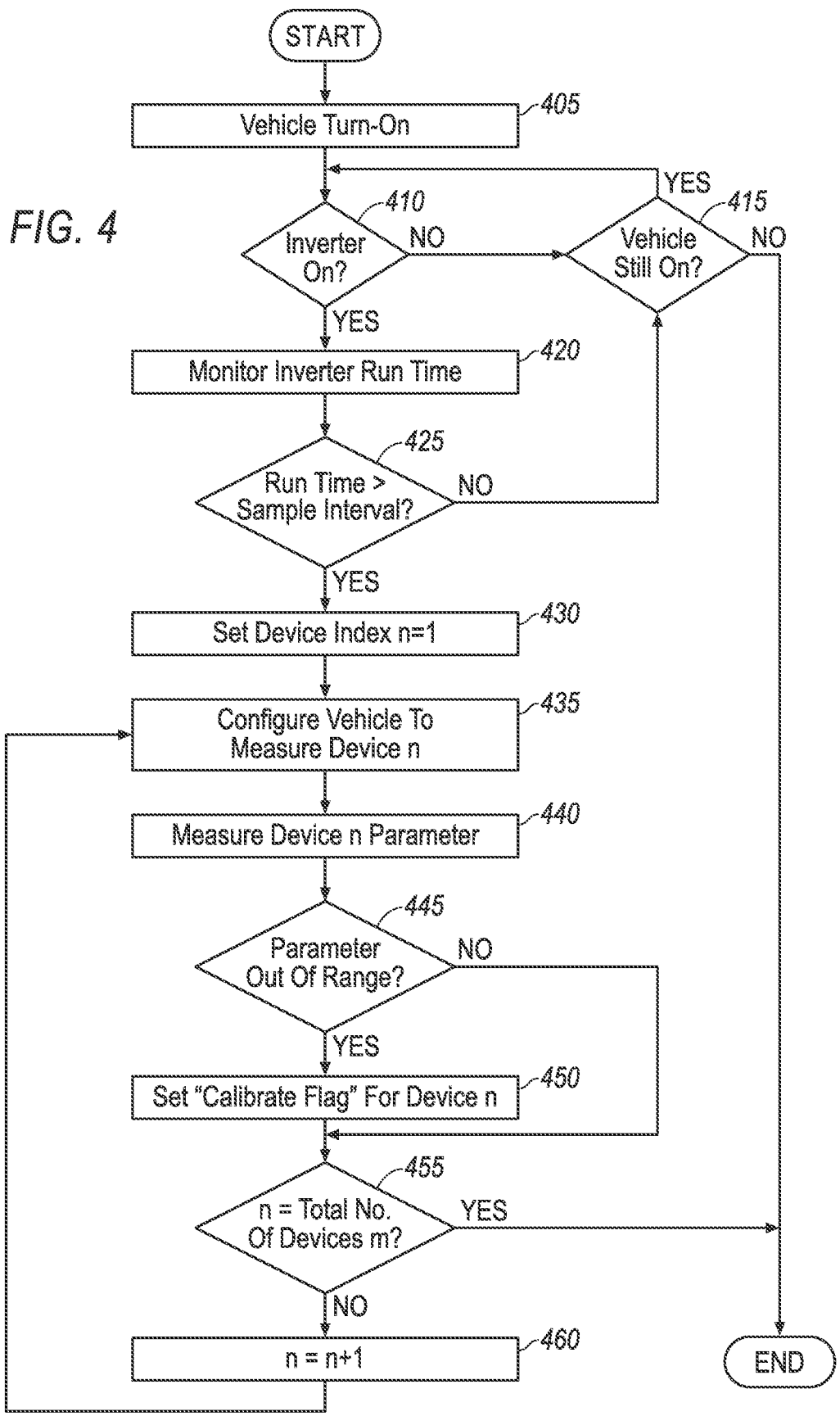
FIG. 4 is a diagram of an exemplary process for measuring power device parameters.

FIG. 4 is a flow chart for an exemplary process 400 for measuring electrical parameters of a power device 22. The process 400 begins in a block 405.

In the block 405, the vehicle 10 is turned on. The computer 24 may be activated based on the turning on of the vehicle 10. This may mean for example that power is applied to the computer 24 or that the computer 24 is woken up from a sleep mode or otherwise set to an active mode to initiate the process 400 for measuring the threshold of the power device 22. Upon turning on the vehicle 10 and activating the computer 24, the process 400 continues in a block 410.

In the block 410, the computer 24 is programmed to determine whether the inverter 20 is operating. That is, the computer 24 may receive data from a sensor associated with the inverter 20 indicating that the inverter 20 is actively driving the motor 28 or powered up in a condition to switch the power devices 22. In the case, that the inverter 20 is not operating, the process 400 continues in a block 415. In the case that the computer 24 determines that the inverter 20 is operating, the process 400 continues in a block 420.

In the block 415, which may follow the block 410, the computer 24 determines whether the vehicle 10 is still turned on. For example, the computer 24 may monitor the ignition input of the vehicle 10 to determine that the ignition remains in the "on" position. In the case of the vehicle 10 is no longer turned on, the process 400 ends. In the case that the vehicle 10 continues to operate, process 400 returns to the block 410 to monitor the operation of the inverter 20.

In the block 420, which may follow the block 410, the computer 24 monitors the inverter 20 run time since last measurement. The run time since last measurement is defined herein as the time of operation of the inverter 20 since a last measurement of the power device parameters. Upon determining, as described in the block 410, that the inverter 20 is operating, the computer 24 enables a counter that monitors the run time since last measurement. In the block 420, which may run concurrently with the other blocks in the process 400, the computer 24 continues to monitor and to count the time that the inverter 20 is operating. The run time since last measurement of the inverter 20 may be used to estimate how many times that the respective power devices 22 in the inverter 20 have been switched since the last measurement. Upon enabling the timer, the process 400 continues in a block 425.

The previous paragraph describes monitoring an inverter 20 run time. In some cases, power devices-22 may be included in other components, for example the charging unit 44. The computer 24 may monitor the run time since last measurement of any vehicle component.

In the block 425, the computer 24 determines whether the run time since last measurement, as monitored in the block 420, is equal to or exceeds a sample interval. The sample interval may be defined as a time following the last measurement of parameters of the power devices 22, before triggering a next measurement of the parameters of the power devices 22. In the case that the run time since last measurement is less than the sample interval, the process 400 continues in the block 415. In the case that the run time since last measurement is greater than or equal to the sample interval, the process 400 continues in a block 430.

In the block 430, the computer 24 initiates the measurement mode. The computer 24 may set a device index n=1. During the measurement mode, the computer 24 may be programmed to measure one or more of the power devices 22 in the inverter 20. For example, in the case of the inverter 20 as shown in FIG. 3, the computer 24 may be programmed to measure each of the power devices 22-1 through 22-6, sequentially, in a loop. The computer 24 may set the device index n=1 to measure the first power device 22, for example power transistor 22-1, and then increment the index to measure additional power devices 22. Upon setting the device index n=1, the process 400 continues in a block 435.

In the block 435, the computer 24 is programmed to measure the power device 22-*n*. To measure the power device 22-*n*, the computer 24 may be programmed to couple the inverter 20 and measurement unit 26 such that the electrical nodes and signals to be measured (e.g., as described in reference to Table 1 above) are available for measurement at the measurement unit 26. For example, in the case of n=1, the computer 24 is programmed to provide access to the measurement unit 26 to the gate terminal G1 and node L1 (coupled to the source terminal S1) connected to the power device 22-1 and to the signal IL1 output by the current sensor CS1. The process 400 continues in a block 440.

In the block 440, the computer 24 is programmed to measure the power device 22-*n*, via the measurement unit 26. The measurement unit 26 may monitor the current through the drain terminal of the power device 22-*n* based on a signal from the respective current sensor. Further, the measurement unit 26 may monitor a voltage across the gate and source terminals of the power device 22-*n*.

For example, to measure the power device 22-1, the computer 24 may be programmed to turn the power device 22-4 off. In the case of the power device 22-4 off, the current I1 through the node L1 is equal to the drain current of power device 22-1. The measurement unit 26 may monitor the signal IL1 to determine the current through the node L1. The measurement unit 26 may then monitor the voltage between the power device 22-1 gate terminal G1 and the power device 22-1 source terminal S1 coupled to node L1. Alternatively, the measurement unit 26 may apply the voltage between the gate terminal G1 and the source terminal S1 and cause the voltage to change as a function of time. Alternatively, the measurement unit 26 may monitor the voltage between the gate terminal G1 and the source terminal S1 while the power device 22-1 is operating to deliver power to the load 60 (which may include the motor 28), and is switching from an off state to an on state.

When the current I1, as determined based on the signal IL1, passes a predetermined threshold, the measurement unit 26 measures the voltage from the gate terminal G1 to the source terminal S1. Based on this data, the measurement unit 26 determines the threshold voltage of the power device 22-1. Typically, the predetermined current is selected such that the voltage from the gate terminal G1 to the source terminal S1 is equal to the threshold voltage. The predetermined current for the power device 22-1 is typically in a range from 100 nanoamperes to 100 milliamperes.

Additionally or alternatively, the measurement unit 26 may measure an on-resistance of the power device 22-1. The measurement unit may apply a voltage between the gate terminal G1 and the source terminal S1. The measurement unit 26 may further measure a voltage from Power to L1, and monitor the current IL1 to determine the current I1. The measurement unit 26 may determine the on-resistance=(the voltage from Power to L1)/I1. Upon determining the threshold voltage or on-resistance for the power device 22-*n*, the process 400 then continues in a block 445.

In the block 445, the computer 24 determines whether the threshold voltage and/or on-resistance for power device 22-*n* is out of a predetermined range. The predetermined range may be, for example, a specified operating range for the power device 22-*n* or, an operating range determined to be optimal for operation for the vehicle 10. In the case that the threshold voltage or on-resistance for the power device 22-*n* is out of the predetermined range, process 400 continues in a block 450. Otherwise, the process 400 continues in a block 455.

In the block 450, the computer 24 sets a "calibration flag" for the power device 22-*n*. That is, the computer 24 stores a value in memory associated with the computer 24, the value being the calibration flag, e.g., a binary variable set to 1, specifying that the threshold voltage or on-resistance of the power device 22-*n* is out of the predetermined range. The calibration flag may be an indication to the computer 24 to perform an adjustment to the power device 22-*n*. The process 400 then continues in a block 455.

In the block 455, the computer 24 determines whether the device index n exceeds or is equal to the total number m of power devices 22 in the inverter 20. In the case that the n=m, the process 400 ends. In the case that the device index n is less than the total number m of power devices 22 in the inverter 20, the process 400 continues in a block 460.

In the block 460, the computer 24 increments the device index n. The process 400 then continues in the block 435.

Figure 5A:
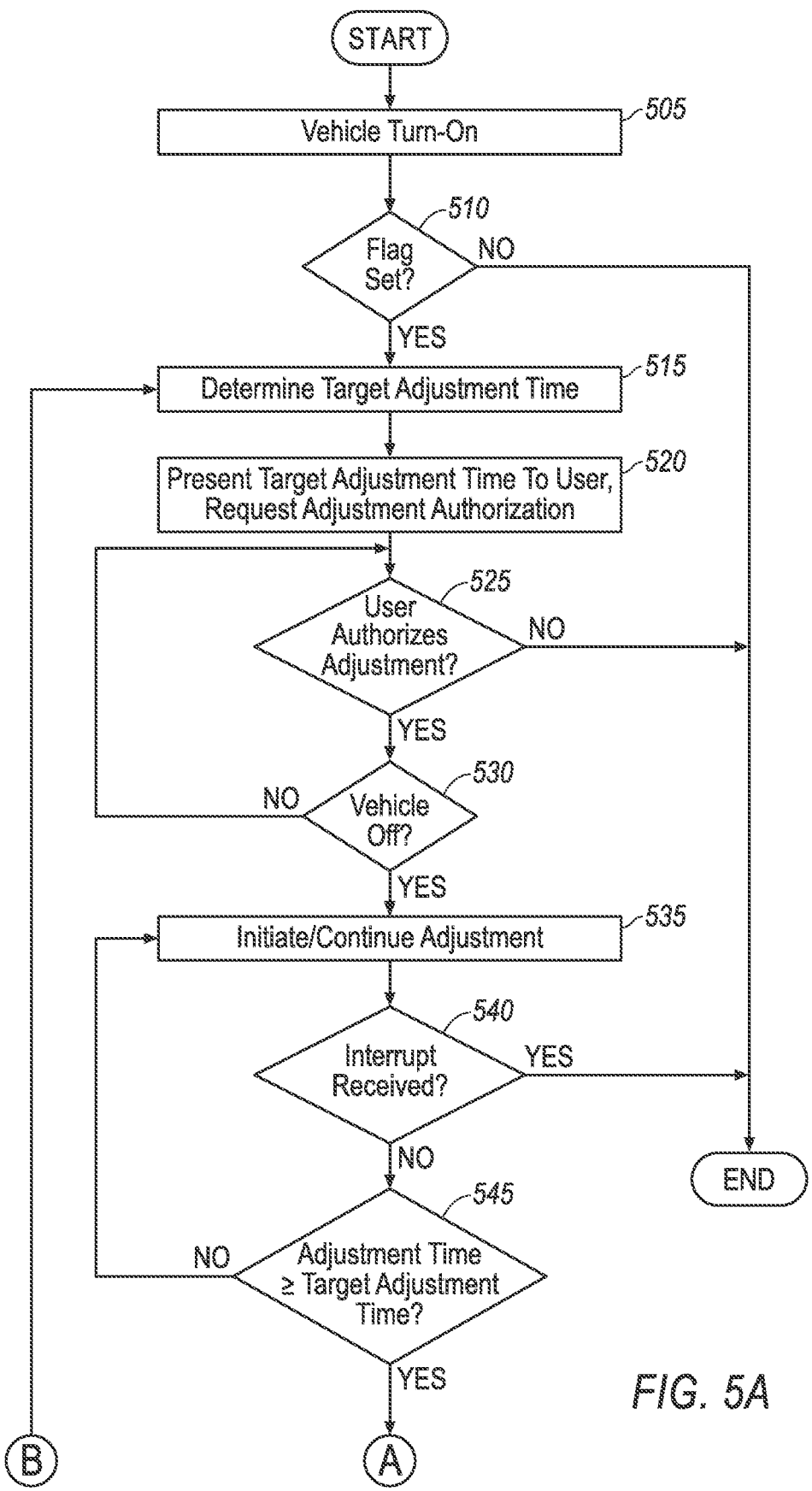
FIG. 5A is a diagram of a first portion an exemplary process for adjusting parameters of a power device.
Figure 5B:
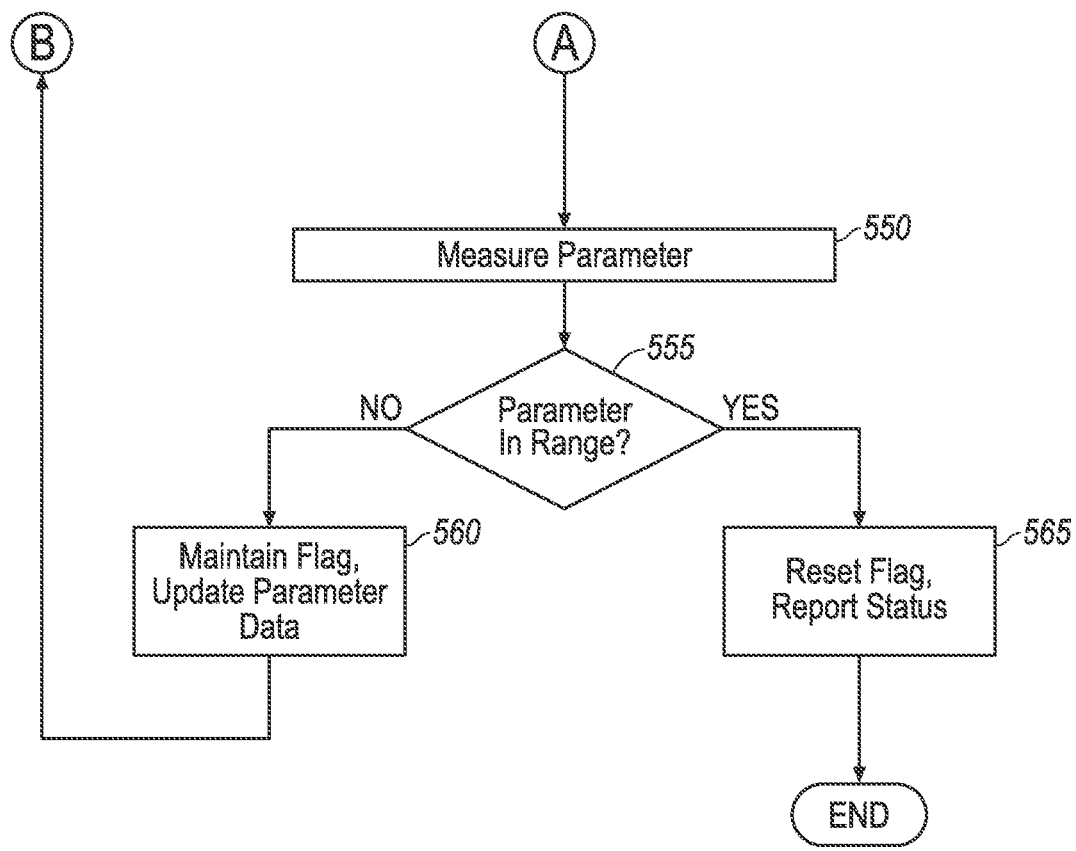
FIG. 5B is a diagram of a second portion of the exemplary process of FIG. 5A.

FIGS. 5A and 5B are a diagram for an exemplary process for adjusting a parameter of a power device 22. The parameter to be adjusted may be, for example, the threshold or the on-resistance of the power device 22. The process 500 begins in a block 505.

In the block 505, the vehicle 10 is turned on. The computer 24 in the vehicle 10 is activated. This may mean for example that power is applied to the computer 24 or that the computer 24 is woken up from a sleep mode or otherwise set to an active mode to initiate the process 500 for adjusting the parameters of the power device 22. Upon turning on the vehicle 10 and activating the computer 24, the process 500 continues in a block 510.

In the block 510, the computer 24 determines if at least one calibration flag is set indicating that a threshold voltage or on-resistance of at least one power device 22 is out of the predetermined range. In the case that no calibration flag is set, the process 500 ends. In the case that at least one calibration flag is set, the process 500 continues in a block 515.

In the block 515, the computer 24 determines a target adjustment time to adjust the parameters of the at least one power device 22 ("the power device 22 to be adjusted") for which the threshold or on-resistance is determined to be out of the predetermined range. The target adjustment time is defined herein as an estimated time required for heating the power device 22 to adjust the threshold voltage or on-resistance to a target threshold voltage or on-resistance. The target threshold voltage or on-resistance of the power device 22 to be adjusted may be, for example, an original threshold voltage or original on-resistance for the power device 22. For example, the computer 24 may maintain a record of the threshold voltages and/or on-resistances of the power devices 22 at the time of manufacture. As another example, the target threshold voltage and/or on-resistance of the power device 22 to be adjusted may be a value within the predetermined range, or within a range based on the predetermined range.

For example, the target threshold voltage of the power device 22 to be adjusted may be a value within a range that is included in, but smaller than the predetermined range. The predetermined range may be defined as $V_{range-min} \leq$ predetermined range $\leq V_{range-max}$, where $V_{range-min}$ is the minimum voltage of the predetermined range and $V_{range-max}$ is the maximum voltage of the predetermined range. In this case, the range for adjusting the target threshold voltage of the power device 22 to be adjusted may defined as $(V_{range-min}+x\%) \leq$ predetermined range $\leq (V_{range-max}-x\%)$, where x is a value selected to provide some operating margin following the adjustment, such as 10. In the case that a single power device 22 is to be adjusted, the computer 24 determines the difference between the threshold voltage of the power device 22 to be adjusted and the target threshold voltage of the power device 22 to be adjusted.

Based on the difference between the target threshold voltage and the actual threshold voltage, and further based on a temperature for performing the adjustment, the computer 24 may determine an estimated adjustment time for adjusting the threshold of the power device 22 to be adjusted. The rate at which the threshold voltage is adjusted may depend on the temperature of the power device 22 during the adjustment. The temperature of the power device 22 to be adjusted during the adjustment process is referred to herein as the adjustment temperature. The adjustment temperature may be determined, for example, based on, e.g., a temperature to which the power devices 22 or other elements of the vehicle 10 such as the inverter 20, the pump 34, etc., can be heated without damaging the power devices 22 or other elements, with a margin to allow for variations between vehicles 10. An adjustment temperature range is a range including the adjustment temperature, such as the adjustment temperature +/−10%, as a target for controlling the adjustment temperature.

Based on the determined adjustment temperature, and a rate at which the threshold is adjusted, the expected adjustment time may be calculated. A rate at the which the threshold is adjusted may be determined based on a type of the power device 22 to be adjusted. Alternatively, the rate at which the threshold is adjusted may be determined based on historical adjustment data of the power device 22 to be adjusted as described below.

In some cases the expected adjustment time may be determined from a table maintained by the computer 24. For example, for a known adjustment temperature, the table may list expected adjustment times as a function of the difference between the actual threshold voltage and the target threshold voltage of the power device 22, based on one or both of device type data and device historical data.

The computer 24 may maintain, i.e., store in memory, a record or history of adjustments to power devices 22. The record of adjustments may indicate an adjustment time that was required to adjust the power device 22 to be adjusted during a previous adjustment. In this case, the expected adjustment time may be based, in part on the adjustment time that was required for the previous adjustment. For example, for a previous measurement, an amount of the threshold adjustment and a time for the adjustment may be recorded. Based on the previous measurement, a rate for the threshold adjustment equal to the threshold adjustment divided by the time of the threshold adjustment may be determined. The time for a current adjustment may be determined based on the rate for adjustment calculated from the previous adjustment and the difference of the actual threshold voltage from the target threshold voltage.

In some cases, an adjustment profile may be generated for adjusting the power device 22. The profile is a set of data that includes a sequence of adjustment times, and respective adjustment temperatures for the device 22. For example, the computer 24 may be programmed to heat the power device 22 to a first temperature for a first adjustment time, and then to a second temperature for a second adjustment time.

In the case that more than one power device 22 has a threshold voltage out of the predetermined range, the adjustment time determination may be made based on the power device 22 with the largest difference between the actual threshold voltage and the target threshold voltage.

In the case that the parameter to be adjusted is the on-resistance, a similar approach may be taken to determine the adjustment time. A target on-resistance may be identified based on data related to the power device 22-n. A difference between the actual on-resistance and the target on-resistance may be determined. Then, based on the difference between the target on-resistance and the actual on-resistance, and further based on a temperature for performing the adjustment, the computer 24 may determine an estimated adjustment time for adjusting the on-resistance of the power device 22-n to be adjusted. Upon determining the adjustment time, the process 500 continues in a block 520.

In the block 520, the computer 24 requests authorization from a user to perform the adjustment process. For example, the computer 24 may send the message to the user via the HMI 50. The message may include information recommending an adjustment be performed on the power device 22 to be adjusted and further indicating the expected adjustment time. The message may further request authorization from the user to execute the adjustment. Upon requesting authorization from the user, the process 500 continues in a block 525.

In the block 525, the computer 24 determines whether the user has authorized the adjustment. For example, the computer 24 may wait a predetermined time after requesting authorization from the user. The case that the computer 24 receives an input authorizing the adjustment, the process 500 continues in a block 530. In the case that the computer 24 does not receive the input authorizing adjustment process within the predetermined time, the process 500 ends.

In the block 530, the computer 24 determines whether the vehicle 10 is turned off. For example, the computer 24 may monitor the vehicle ignition to determine whether the ignition is switched to an off state. In the case that the vehicle is turned off, the process 500 continues in a block 535. In the case that the vehicle 10 continues to operate, the process continues in a block 525.

In a block 535, the computer 24 initiates the adjustment. The computer 24 actuates components in the vehicle 10 to heat the power devices 22 in the inverter 20. In one example, the computer 24 turns on the heating unit 38. Further, the computer 24 activates the pump 34 such that coolant is pumped from the coolant tank 30, through the pump 34, further through the heating unit 38, through the inverter 20, and back to the coolant tank 30. The computer 24 controls the heating unit 38 to maintain the coolant within the adjustment temperature range, as described above. As noted above, in some cases, the coolant tank 30 may not be necessary. In these cases, the computer 24 activates the pump 34 such that the coolant is pumped through the pump 34, further through the heating unit 38, through the inverter 22 and back to the pump 34.

To provide power to the heating unit 38, the vehicle 10 may be connected to an external power source, such as the power source 52. In this case, the computer 24 may, for example, send instructions to the user via the HMI 50 to plug the vehicle 10 into the power source 52. The heating unit 38 may receive power directly from the power source 52. Alternatively, the battery 46 may be charged from the power source 52 and the heating unit 38 may receive power from the battery 46.

In other cases, the engine 29 may provide power for the heating unit 38. The heating unit 38 may receive power from the battery 46 and the engine 29 may be run to recharge the battery 46. Upon initiating the adjustment process and providing a source of power to the heating unit 38, the process 500 continues in a block 540.

In the block 540, the computer 24 determines whether an input is received to terminate the process 500. The input may be an input from the user indicating that the computer 24 should terminate the adjustment process. For example, the input may be a signal from the vehicle ignition that the vehicle 10 has been turned on. As another example, the input may be an input from the vehicle 10, e.g., based on user input, to terminate the adjustment process. In the case that the input is detected, the process 500 ends. In the case that no input to is detected, process 500 continues in a block 545.

In the block 545, the computer 24 determines whether an adjustment run time is greater than or equal to the target adjustment time. The adjustment run time is defined to mean a time during which the power device is being heated by the vehicle components. In the case that the adjustment run time is less than the target adjustment time, the process 500 continues in a block 535. In the case that the adjustment run time is greater than or equal to the target adjustment time, process 500 continues in a block 550.

In the block 550, the computer 24 initiates, via the measurement unit 26, a measurement of the power device 22 that is being adjusted. The computer 24 implements the measurement in a manner similar to the manner described in reference to the blocks 435 and 440 above. That is, in the case of the threshold voltage adjustment, the computer 24 can send instructions to the inverter 20 apply a varying gate-source voltage to the power device 22 that that is being adjusted. The measurement unit 26 can then determine the threshold voltage of the power device 22 based on the gate-source voltage of the power device 22 when the drain current reaches a predetermined current. In the case of an on-resistance adjustment, the computer 24 can send instructions to the inverter 20 to apply a voltage from gate to source of the power device 22 that is being adjusted. The computer 24 can further instruct the measurement unit to measure a current from drain to source through the power device 22 that is being adjusted and a voltage from drain to source of the power device 22 that is being adjusted. The on-resistance can be determined based on the voltage from drain to source and the current from drain to source of the power device 22 to be adjusted. Upon completing the measurement of the threshold voltage and/or determining the on-resistance of the power device 22, the process 500 continues in a block 555.

In the block 555, the computer 24 determines whether the threshold voltage or the on-resistance of the power device 22 that is being adjusted is within a target range. The target range is a range extending respectively around the target threshold voltage or on-resistance. For example, the target threshold range may be the target threshold voltage +/−10%. In the case that the threshold voltage is not within the target threshold range, the process continues in a block 560. In the case that the threshold voltage is within the target threshold range, process continues in a block 565.

In the block 560, the computer 24 maintains the calibration flag in the set condition. The computer 24 further updates the current threshold and/or on-resistance data to reflect the actual threshold and/or on-resistance of the power device 22 to be adjusted. The process 500 then continues in the block 515.

In a block 565, which may follow the block 555, the computer 24 resets the calibration flag, i.e., from "set" or binary 1 to unset, or binary zero. The computer 24 further reports the status of the power device 22. The computer 24 may, for example, display a message on the HMI 50 indicating that the adjustment process was successful. The computer 24 may further store data representing the actual parameters of the power device 22. The computer 24 may further provide data to the server 12. As described above, the server 12 may use the data to develop statistical data regarding the results of adjustments performed on the power devices 22. Upon resetting the calibration flag and reporting the status of the power device 22, the process 500 ends.

Figure 6A:
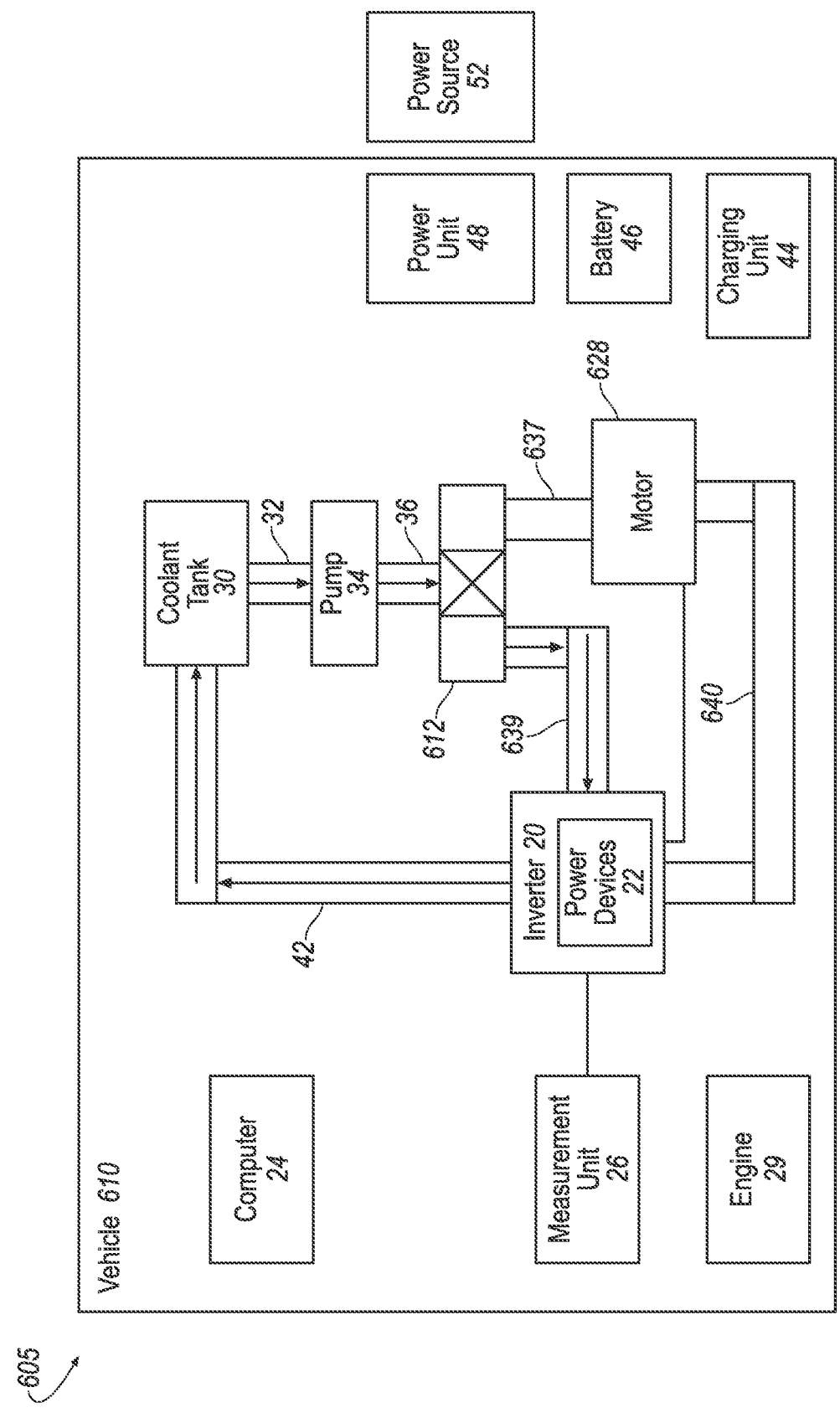
FIG. 6A is a diagram of an exemplary vehicle configured for measuring and adjusting the electrical parameters of power devices including valves for controlling coolant flow switched to a position for normal operation.
Figure 6B:
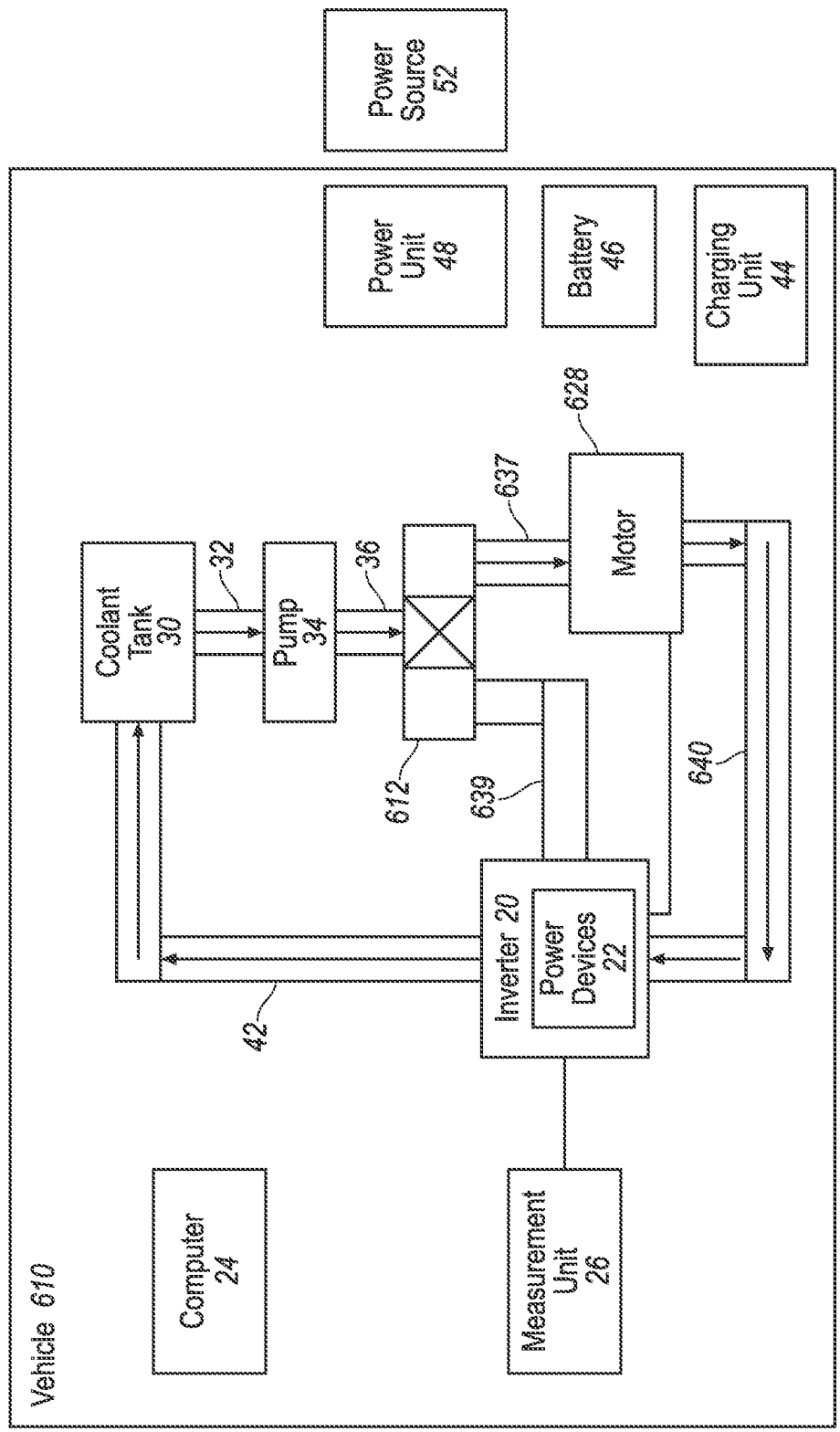
FIG. 6B is a diagram of the exemplary vehicle of FIG. 6A with the valves switched to a position for adjusting the electrical parameters of the power devices.

FIGS. 6A and 6B illustrate an example vehicle 610 including a mechanism for adjusting parameters of power devices 22. The example vehicle 610 includes the same or similar components as the vehicle 10, except that the vehicle 610 does not include the heating unit 38 or the motor 28, and additionally includes the motor 628 and the valve 612. The motor 628 and valve 612 are arranged such that heat from the motor 628 can be transferred to coolant and used to heat power devices 22 in the inverter 20 during the adjustment mode. FIG. 6A illustrates the vehicle 610 configured for normal operation. FIG. 6B illustrates the vehicle 610 configured for the adjustment mode.

The vehicle 610 includes the valve 612. In a first position, used for normal mode, the valve directs coolant from the pump 34 directly to the inverter 20 via the pipe 639. In this mode, the coolant is provided to cool the inverter 20.

FIG. 6B illustrates the vehicle 610 in the adjustment mode. In the adjustment mode, the computer 24 switches the valve 612 to a second position. In the second position, the valve 612 directs coolant from the pump 34 towards the motor 628. The motor 628 can heat the coolant during the adjustment mode. That is, the motor 628 may be running thereby generating heat. The coolant may be directed through the motor to collect heat from the motor. The coolant is further directed via the pipe 640 to the inverter 20 to transfer the heat from the motor 28 to the power devices 22 in the inverter 20.

During the adjustment, the computer 24 may monitor the coolant temperature, and turn the motor on and off, to regulate the coolant temperature within a target temperature range. Power to drive the motor may be received from an external power source 52, which may be, for example, an electrical outlet. Alternatively, the vehicle 610 may include an engine 29, which may be operated from time to time to charge the battery 46. In this case, the motor 628 may receive power from the battery 46.

In another example, a positive temperature co-efficient (PTC) heater, such as a cabin heater, can be used to heat the coolant during the adjustment mode. A valve can be included in a vehicle to direct coolant flow through the PTC heater during the adjustment mode.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A computer comprising a processor; and a memory, the memory storing instructions executable by the processor such that the processor is programmed to:
    determine, based on a measurement of an electrical parameter of a power switching device performed in a vehicle, that the electrical parameter of the power switching device is outside of a predetermined range; and
    actuate first components in the vehicle to heat the power switching device, based on the determination that the electrical parameter of the power switching device is outside of the predetermined range.

2. The computer of claim 1, wherein the processor is further programmed to:
    determine that the power switching device is heated for a predetermined time;
    perform a second measurement on the power switching device;
    determine, based on the second measurement, that the electrical parameter of the power switching device is in a target range; and
    store a status of the power switching device.

3. The computer of claim 1, wherein the electrical parameter of the power switching device outside of the predetermined range is one of a threshold voltage and an on-resistance.

4. The computer of claim 1, wherein the processor is further programmed to:
    determine, based on the measurement, a target time to heat the power switching device.

5. The computer of claim 4, wherein the processor is further programmed to:
    monitor an adjustment time during which the power switching device is being heated by the first components; and
    actuate the first components to stop heating the power switching device when the adjustment time during which the power switching device is being heated by the first components is greater than or equal to the target time.

6. The computer of claim 1, wherein the processor is further programmed to:
    activate a heating unit in the vehicle; and
    pump coolant along a coolant path to transfer heat from the heating unit to the power switching device.

7. The computer of claim 1, wherein the processor is further programmed to:
    actuate second components in the vehicle to perform the measurement, including:
        changing a gate-source voltage of the power switching device as a function of time;
        monitoring a current through the power switching device; and
        measuring the gate-source voltage when the current through the power switching device reaches a predetermined current.

8. The computer of claim 7, wherein determining that the electrical parameter of the power switching device is outside of the predetermined range includes programming to:
    determine that the gate-source voltage when the current through the power switching device reaches the predetermined current is outside of the predetermined range.

9. The computer of claim 1, wherein the processor is further programmed to:
    request, via a human-machine interface, authorization to adjust the power switching device; and
    actuate the first components based in part on receiving authorization to adjust the power switching device.

10. The computer of claim 9, wherein requesting the authorization to adjust the power switching device includes programming to:
    display, at the human-machine interface, a target time for heating the power switching device.

11. A method, executable by a computer comprising a processor; and a memory, the memory storing instructions executable by the processor, comprising:
    determining, based on a measurement of an electrical parameter of a power switching device performed in a vehicle, that the electrical parameter of the power switching device is outside of a predetermined range; and
    actuating first components in the vehicle to heat the power switching device, based on the determination that the electrical parameter of the power switching device is outside of the predetermined range.

12. The method of claim 11, further comprising:
    determining that the power switching device is heated for a predetermined time;
    performing a second measurement on the power switching device;
    determining, based on the second measurement, that the electrical parameter of the power switching device is in a target range; and
    storing a status of the power switching device.

13. The method of claim 11, further comprising:
    determining, based on the measurement, a target time to heat the power switching device.

14. The method of claim 13, further comprising:
    monitoring an adjustment time during which the power switching device is being heated by the first components; and
    actuating the first components to stop heating the power switching device when the adjustment time during which the power switching device is being heated by the first components is greater than or equal to the target time.

15. The method of claim 11, further comprising:
    activating a heating unit in the vehicle; and
    pumping coolant along a coolant path to transfer heat from the heating unit to the power switching device.

16. The method of claim 11, further comprising:
    actuating second components in the vehicle to perform the measurement, including:
        changing a gate-source voltage of the power switching device as a function of time;
        monitoring a current through the power switching device; and
        measuring the gate-source voltage when the current through the power switching device reaches a predetermined current.

17. The method of claim 16, wherein determining that the electrical parameter of the power switching device is outside of the predetermined range includes:
    determining that the gate-source voltage when the current through the power switching device reaches the predetermined current is outside of the predetermined range.

18. The method of claim 11, further comprising:
    requesting, via a human-machine interface, authorization to adjust the power switching device; and actuating the first components based in part on receiving authorization to adjust the power switching device.

19. A system comprising a vehicle comprising:

a power switching device;

measurement means for measuring an electrical parameter of the power switching device; and a computer, comprising a processor; and a memory, the memory storing instructions executable by the processor such that the processor is programmed to:

determine, based on the measurement of the electrical parameter of the power switching device performed in the vehicle by the measurement means, that the electrical parameter of the power switching device is outside of a predetermined range; and actuate components in the vehicle to heat the power switching device, based on the determination that the electrical parameter of the power switching device is outside of the predetermined range.

20. The system of claim 19, wherein the processor is further programmed to:

determine that the power switching device is heated for a predetermined time;

perform a second measurement on the power switching device;

determine, based on the second measurement, that the electrical parameter of the power switching device is in a target range; and store a status of the power switching device.

* * * * *